United States Patent Office 3,001,947
Patented Sept. 26, 1961

3,001,947
AQUEOUS AMMONIUM HYDROXIDE DETERGENT COMPOSITION
Alvin Stahler and Leonard Stahler, both of 637 Monroe Ave., Scranton, Pa.
No Drawing. Filed Sept. 30, 1957, Ser. No. 686,867
21 Claims. (Cl. 252—152)

This invention relates to aqueous detergent compositions containing ammonium hydroxide in solution and process for making same.

The object of this invention is to provide a household ammonia composition having superior cleansing and detergent properties which remains stable and free of precipitation throughout its shelf life, in which volatization of ammonia is suppressed and objectionable odor is effectively minimized and masked, and which is permanently and pleasingly tinted.

Broadly speaking, our new aqueous ammonium hydroxide composition comprises an aqueous solution of ammonium hydroxide containing, in addition, an anionic surface-active agent, a non-ionic surface-active agent, a colloidally dispersed water-insoluble, pleasantly fragrant component having a substantial vapor pressure at ordinary temperatures, and water-soluble dyes properly selected both for desirable tinting effect and stability to atmospheric oxidation. It is generally preferable that the pH of the solution be within the range of about 7.5 to 9.0. In some cases, it may be desirable, though not essential, to incorporate an ammonium salt, such as ammonium chloride or ammonium sulfate, which, by virtue of the common ammonium ion, functions to reduce ionization of the ammonium hydroxide and thereby to control the pH.

The concentration of ammonium hydroxide in the composition can be from 1 to 26%, although for most purposes, it is preferably about 3 to 5%. Commercial aqua ammonia having a density of 26° Bé. can be employed in formulating the composition. When an ammonium salt such as ammonium chloride is incorporated for pH control, about 0.1 to 0.3 mol per liter is generally adequate.

Any suitable water-dispersible anionic, surface-active agent having substantial foaming and detergent properties may be employed for our purpose. These include, for example, the alkali metal higher-alkyl sulfates and sulfonates in which the alkyl group preferably contains at least 10 carbon atoms, such as sodium or potassium lauryl sulfate, the alkali metal salt of an alkylaryl sulfonate in which the alkyl group preferably contains 10 to 18 carbon atoms and the aryl group can be phenyl or naphthyl; the alkali metal salt of an alkylaryloxy polyoxyethylene sulfate or sulfonate, such as the sodium salt of isobutylphenoxy pentaethoxy sulfate, and the like.

The anionic surface-active agent functions both to impart a high degree of detergency to the cleansing composition and to provide a blanketing foam when the composition is in use, which coats the liquid thereby maintaining a high concentration of ammonia gas in contact with the aqueous solution and suppressing further volatization of the ammonia in solution. The amount of anionic surface-active agent employed is determined by the specific detergency and foaming characteristics of the particular material and by the degree of detergency desired in the particular composition. As little as 0.1% by weight of the anionic detergent can be adequate for our purpose. In general, we prefer to employ about 0.2 to 5%, although as much more as desired can be used within the water-dispersibility limits of the particular detergent compound.

Although the foaming action of the anionic detergent serves substantially to suppress volatilization of the dissolved ammonia and thereby to maintain the ammonium hydroxide in effective concentration in the cleansing solution, the ammonia odor, while minimized, is still objectionable. We have found that the ammonia odor can be effectively masked by dispersing in the aqueous solution a water-insoluble component having a boiling point above 100° C., a substantial vapor pressure at ordinary temperatures and a pleasing odor or fragrance, by means of a non-ionic, surface-active agent. The non-ionic, surface-active agent is essential to maintain the water-insoluble, fragrant component in stable, collodial solution or dispersion and to make possible the aesthetically-appealing tinting effects which will subsequently be described.

The masking component can be any suitable material having the aforedescribed characteristics, namely water-insolubility, a boiling point higher than water, substantial vapor pressure at ordinary temperatures and a pleasing fragrance, as, for example, terpenes and terpene derivatives such as isobornyl acetate, terpene-containing essential oils such as pine oil, lemon grass oil, oil of sassafras, and the like. The particular vapor pressure of a given material is not critical so long as it is sufficient to provide the desired masking of the ammonia odor. The actual degree of masking can, of course, be controlled by adjusting the concentration of the particular masking component, high vapor pressure materials being added to the cleansing composition in smaller amounts than materials having lower vapor pressure characteristics. In some cases concentration of the masking component can be as low as 0.1 to 0.2% by weight and it is generally not necessary to employ more than about 2 to 3% although more can be used if desired.

As aforementioned, a water-dispersible non-ionic surface-active agent is essential stably to disperse the water-insoluble masking component. The non-ionic agent is preferably a higher fatty acid ester, such as sorbitan monolaurate, sorbitan monooleate, sorbitan trioleate, glycerol sorbitan laurate and the like, or a polyoxyalkylene derivative such as the polyoxyalkylene derivatives of a higher fatty acid ester, a higher fatty alcohol, an alkyl phenol, an alkylnaphthol, a higher fatty acid and the like as, for example polyoxyethylene sorbitan monolaurate and dilaurate, polyoxyethylene sorbitan monopalmitate, polyoxyethylene sorbitan monooleate and trioleate, polyoxyethylene sorbitan monostearate, dodecyloxy polyoxyethylene ethanol, isooctylphenoxy polyoxyethylene ethanol, polyoxyethylene stearate and the like. The non-ionic agent, though employed essentially for its dispersing action on the masking component, also contributes to the detergency and foaming action of the cleansing composition. The minimum concentration of the non-ionic agent usually required for dispersing effect is about 0.1 to 0.2% by weight. In general we prefer to employ about 0.2 to 2%, although there is no critical upper limit and as much more, as desired, can be used within water-dispersibility limits.

The non-ionic agent so effectively disperses the water-insoluble masking agent that at temperatures above approximately 60-70° F., usually about 65° F., the masking agent is essentially in colloidal solution so that the liquid is clear and is characterized by very low light scattering and Tyndall Effect. At lower temperatures, some agglomeration of the dispersed colloid occurs, increasing particle size to the order generally of somewhat less than 0.2 micron and thereby imparting translucence to the liquid. The change-over temperature between optical clarity and translucence varies, of course, with the particular masking component, the particular non-ionic dispersing agent and their concentrations.

Tinting household ammonia solutions has hitherto been a difficult problem because of pH of the solution and atmospheric oxidation during shelf life. We have found that a water-soluble dye system consisting of a phthalein dye and a triphenylmethane dye, preferably in a weight ratio of about 2:1, is stable through the alkaline pH range of the ammonium hydroxide solution and is resistant to color destruction by oxidation because of the oxidation-reduction or redox equilibrium of the dye components. The pleasing color imparted by the dyes to the ammonium hydroxide detergent solution, therefore, remains unimpaired throughout the storage life of the compositions.

Furthermore, the mixture of dyes, in combination with the colloidally dispersed odor-masking component, provides interesting and pleasant visual effects. At temperatures sufficiently low to cause aggregation of the colloidal particles and translucency, e.g. below approximately 65° F., the dye mixture produces a unique and visually appealing opalescence and change in color tone. At higher temperatures, when the dispersed particles are substantially in colloidal solution so that light scattering or Tyndall effect is small, the solution is pleasingly colored and optically clear.

Any suitable, water soluble phthalein dye, such as phenolphthalein, fluorescein, erythrosin and eosin, and triphenylmethane dye, such as malachite green, pararosaniline, crystal violet, aniline blue and opal blue, can be used, depending on the color desired. As aforementioned the ratio of phthalein to triphenylmethane dye should preferably be about 2:1 for the desired stability. The concentration of total dyestuff depends upon the intensity of color desired. In general amounts from about 0.05 to about 0.8 to 1% by weight are entirely adequate, but more can be employed, if desired.

The compositions are highly stable, in terms, for example, of ammonium hydroxide concentration, freedom from separation of any formulation components or salts produced by the use of hard water, color permanence and lack of objectionable odor, for extended periods of time, in fact for considerably longer than normal shelf life. We have observed that the compositions show no substantial deterioration after storage for more than two years.

We have found that to produce the aforedescribed compositions having the desired stability and appearance, it is essential that the ingredients be compounded in a particular sequence at a maximum temperature of about 60° F., preferably about 40° to 60° F., though lower temperatures can be used. The requisite sequence of addition with continual agitation is as follows:

(1) Non-ionic dispersing agent.
(2) Water-insoluble odor-masking component.
(3) Anionic detergent.
(4) Aqua ammonia 26° Bé., preferably slowly as, for example, over a period of one-half hour.
(5) Water, preferably rapidly.
(6) Dye mixture.

An ammonium salt, such as ammonium chloride, if used, can be dissolved in the water prior to addition of the latter to the other components, or can be added after addition of the water.

*Example I*

A highly stable, pleasantly fragrant and pleasingly tinted ammonium hydroxide detergent composition was prepared by mixing the following ingredients in the given order at a temperature of 60° F. under agitation of about 1750 r.p.m. delivered by a ½ H.P. motor:

| | Parts by weight |
|---|---|
| Polyoxyethylene sorbitan monooleate | 25 |
| Isobornyl acetate | 25 |
| Na salt of an alkylaryl sulfonate (35% active) | 240 |
| Aqua ammonia 26° Bé | 400 |
| Water | 3510 |
| Dye mixture: | |
| Fluorescein | 2 |
| Malachite green | 1 |

*Example II*

A composition was prepared substantially as described in Example I except that the amount of aqua ammonia was doubled, ammonium chloride in a concentration of 0.2 mol/l. was added, and the sodium salt of the alkylaryl sulfate was replaced with an equal weight of potassium dodecyl sulfate.

*Example III*

A composition was prepared substantially as described in Example I except that the polyoxyethylene sorbitan monooleate was replaced by sorbitan monooleate and the isobornyl acetate was replaced by pine oil in equivalent weights.

Although this invention has been described with reference to illustrative embodiments thereof, it will be apparent to those skilled in the art that the principles of this invention can be embodied in other forms but within the scope of the claims.

We claim:

1. An aqueous ammonium hydroxide detergent composition consisting essentially of ammonium hydroxide in a concentration of about 1 to 26% by weight, at least about 0.1% by weight of a water-dispersible anionic surface-active detergent having substantial foaming properties, said anionic detergent being the alkali metal salt of a compound selected from the group consisting of higher-alkyl sulfates, higher alkyl sulfonates, alkylaryl sulfonates, alkylaryloxy sulfates, and alkylaryloxy sulfonates, a water-soluble dye consisting essentially of a mixture of a phthalein dye and a basic triphenylmethane dye, said dye components being present in a weight ratio of about 2 to 1, said mixture of dyes being present in amount sufficient to tint visually said detergent composition, a colloidally-dispersed, water-insoluble terpene compound characterized by substantial vapor pressure at ordinary temperatures, a boiling point above 100 degrees C. and fragrant odor, said water-insoluble material being present in an amount comprising at least about 0.1% by weight of the detergent composition and being dispersed in said aqueous composition by means of a water-dispersible non-ionic surface-active agent, in amount at least about 0.1% by weight, said non-ionic agent being selected from the group consisting of higher fatty acid esters of a polyhydric alcohol, and the polyoxyalkylene derivatives of higher fatty acids, higher fatty alcohols, polyhydric alcohol esters of higher fatty acids, alkylphenols and alkylnaphthols, said non-ionic agent being effective to disperse said terpene compound, said composition being characterized by stably tinted opalescence at lower atmospheric temperatures and stably tinted, substantial optical clarity at higher atmospheric temperatures.

2. The detergent composition of claim 1 in which the minimum concentration by weight of the terpene compound is about 0.1%, and the minimum concentration by weight of the dye mixture is about 0.05%.

3. The detergent composition of claim 1 in which the concentration of ammonium hydroxide by weight is about 3 to 5%, the minimum concentration of the anionic surface-active detergent is about 0.2% by weight, the minimum concentration of the non-ionic surface-active dispersing agent is about 0.2% by weight, and the minimum concentration of the terpene compound is about 0.2% by weight.

4. The detergent composition of claim 1 which includes in addition an ammonium salt selected from the group consisting of ammonium chloride and ammonium sulfate, in an amount sufficient to reduce ionization of the ammonium hydroxide.

5. The detergent composition of claim 1 in which the phthalein dye is selected from the group consisting of phenolphthalein, fluorescein, erythrosin, and eosin, and the triphenylmethane dye is selected from the group consisting of melachite green, pararosanaline, crystal violet, aniline blue, and opal blue.

6. The detergent composition of claim 2 in which the terpene compound is isoborynl acetate and the dye mixture consists essentially of fluorescein and malachite green.

7. The detergent composition of claim 3 in which the terpene compound is iosbornyl acetate and the dye mixture consists essentially of fluorescein and malachite green.

8. The detergent composition of claim 3 which includes in addition an ammonium salt selected from the group consisting of ammonium chloride and ammonium sulfate, in an amount sufficient to reduce ionization of the ammonium hydroxide.

9. The detergent composition of claim 6 which includes in addition at least about 0.1 mol per liter of ammonium chloride.

10. The detergent composition of claim 7 which includes in addition at least about 0.1 mol per liter of ammonium chloride.

11. The detergent composition of claim 7 in which the anionic detergent is the sodium salt of an alkylaryl sulfonate and the non-ionic agent is polyoxyethylene sorbitan monooleate.

12. A process for making an aqueous ammonium hydroxide detergent composition which consists essentially of admixing at a temperature of about 40 to 60 degrees F., at least about 0.1% by weight of a water-dispersible, non-ionic, surface-active agent, said non-ionic agent being selected from the group consisting of higher fatty acid esters of a polyhydric alcohol, and the polyoxyalkylene derivatives of higher fatty acids, higher fatty alcohols, polyhydric alcohol esters of higher fatty acids, alkylphenols and alkylnaphthols, said inon-ionic agent being effective to disperse said terpene compound with at least about 0.1% by weight of a water-insoluble terpene compound characterized by substantial vapor pressure at ordinary temperatures, a boiling point above 100 degrees C. and fragrant odor, adding at least 0.1% by weight of a water-dispersible, anionic surface-active detergent having substantial foaming properties, said anionic detergent being the alkali metal salt of a compound selected from the group consisting of higher-alkyl sulfates, higher alkyl sulfonates, alkylaryl sulfonates, alkylaryloxy sulfates, and alkylaryloxy sulfonates, then adding 26 degree Be' aqua ammonia, adding water in amount sufficient to produce an ammonium hydroxide concentration of about 1 to 26%, and then adding a water-soluble dye consisting essentially of a mixture of a phthalein dye and a triphenylmethane dye, said dye components being present in a weight ratio of about 2 to 1, said mixture of dyes being present in an amount sufficient to tint visually said detergent composition.

13. The process of claim 12 in which the minimum concentration by weight of the terpene compound is about 0.1%, and the minimum concentration by weight of the dye mixture is about 0.05%.

14. The process of claim 12 in which the concentration of ammonium hydroxide by weight is about 3 to 5%, the minimum concentration of the anionic surface-active detergent is about 0.2% by weight, the minimum concentration of the non-ionic surface-active dispersing agent is about 0.2% by weight, and the minimum concentration of the terpene compound is about 0.2% by weight.

15. The process of claim 12 in which an ammonium salt selected from the group consisting of ammonium chloride and ammonium sulfate is added subsequent to the addition of the aqua ammonia, in an amount sufficient to reduce inonization of the ammonium hydroxide.

16. The process of claim 12 in which the phthalein dye is selected from the group consisting of phenolphthalein, fluorescein, erythrosin, and eosin, and the triphenylmethane dye is selected from the group consisting of malachite green, pararosanaline, crystal violet, aniline blue, and opal blue.

17. The process of claim 13 in which the terpene compound is isobornyl acetate and the dye mixture consists essentially of fluorescein and malachite green.

18. The process of claim 13 in which ammonium chloride is added subsequent to the addition of the aqua ammonia in an amount sufficient to reduce ionization of the ammonium hydroxide.

19. The process of claim 14 in which the terpene compound is isobornyl acetate and the dye mixture consists essentially of fluorescein and malachite green.

20. The process of claim 19 in which at least 0.1 mol per liter of ammonium chloride is added subsequent to the addition of the aqua ammonia.

21. The process of claim 19 in which the anionic detergent is the sodium salt of an alkylaryl sulfonate and the non-ionic agent is polyoxyethylene sorbitan monooleate.

References Cited in the file of this patent

UNITED STATES PATENTS

| Re. 17,383 | Englund | July 30, 1929 |
| 2,422,145 | Taylor | June 10, 1947 |
| 2,447,475 | Kaberg et al. | Aug. 17, 1948 |
| 2,554,913 | Kimball | May 29, 1951 |

FOREIGN PATENTS

| 5,343 | Great Britain | 1915 |
| 567,497 | Great Britain | Mar. 18, 1943 |

OTHER REFERENCES

Mid-West Section, "The Solubilization of Dyestuffs with Surface Active Agents," American Dyestuff Reporter, Oct. 3, 1949, pp. 728–732.

Wynne, Walter: "Effect of Perfume Oils on Emulsions," American Perfumer and Essential Oil Review, November 1949, pp. 381–383.